No. 632,530. Patented Sept. 5, 1899.
J. T. & L. P. LEE.
ROPE CLAMP.
(Application filed Jan. 21, 1899.)
(No Model.)

Witnesses
Aw. Stipek
J. S. Doyle.

Inventors
James T. Lee
Lorenzo P. Lee.

By James Shepard
Atty.

UNITED STATES PATENT OFFICE.

JAMES T. LEE AND LORENZO P. LEE, OF NEW BRITAIN, CONNECTICUT.

ROPE-CLAMP.

SPECIFICATION forming part of Letters Patent No. 632,530, dated September 5, 1899.

Application filed January 21, 1899. Serial No. 702,918. (No model.)

*To all whom it may concern:*

Be it known that we, JAMES T. LEE and LORENZO P. LEE, citizens of the United States, residing in New Britain, in the county of Hartford and State of Connecticut, have invented certain new and useful Improvements in Rope-Clamps, of which the following is a specification.

Our invention relates to improvements in rope-clamps; and the main object of our improvement is convenience and efficiency of the article.

Figure 1:
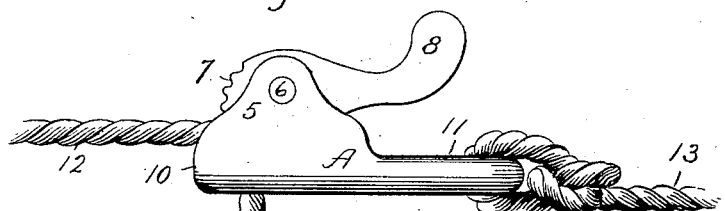
Figure 2:
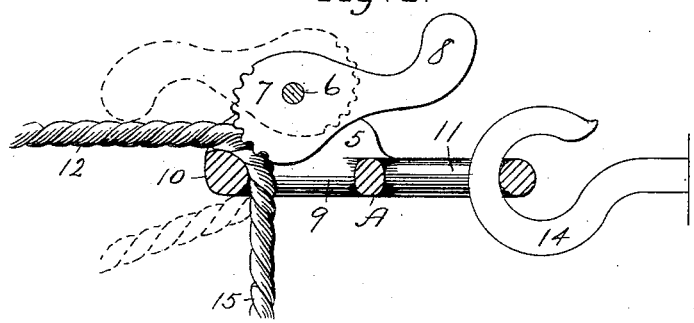
Figure 3:
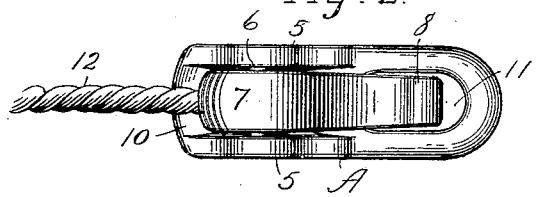
Figure 4:
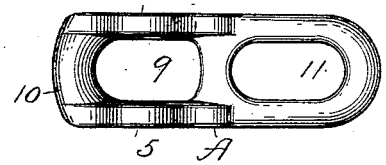

In the accompanying drawings, Figure 1 is a side elevation of our rope-clamp, together with two ends of a rope or ropes. Fig. 2 is a central longitudinal section thereof, with the end of a rope and a hook at the respective ends of the clamp. Fig. 3 is a plan view of the same, with the end of one rope within the clamp; and Fig. 4 is a plan view of the frame.

For convenience of description we will consider the clamp with reference to the position illustrated in Figs. 1 and 2, although when in use it may be placed with a different side uppermost than that so represented.

A designates the frame of our clamp, having toward one end two side ears 5 5, between which we pivot on the pin 6 the snail-like cam 7, from which cam is extended the lever-handle 8, the said cam and handle constituting a single elongated member having an enlarged end formed by the said cam 7. The bottom part of the frame A has at this end a rope-opening 9, that lies between the side ears 5, the cross-bar 10 at the outer end of which opening is of a rounded form specially adapted for drawing a rope over with a return-bend and to have the rope run smoothly. The said cross-bar 10 by its inner rounded face also forms the holding-jaw of the frame that acts in opposition to the cam 7 and lies substantially in the longitudinal line of the lever-handle when the rope is clamped thereby, as shown in Fig. 2. At the opposite end of the frame is an eye 11, which is preferably so long that when the handle-lever is turned down to clamp the rope 12, as shown in Figs. 1, 2, and 3, the said handle-lever will not come in contact with whatever connecting device may be within the said eye. The holding edge of the cam is toothed or serrated, as shown.

Our clamp may be used for various purposes, and is particularly adapted for connecting to two ends of one rope, as in overhead clothes-lines supported on pulleys, or for connecting the ends of two ropes, as in tents, or other taut ropes, in which case one end of a rope 13 is fastened to the eye 11, as shown in Fig. 1. If desired, the eye 11 may be attached to a hook 14, as shown in Fig. 2, the said hook being secured to any fixed support, in which case the clamp could be used in fastening one end of a clothes-line to a post or hammock-rope to its support and other similar uses. In all cases it is intended that the free end 15 of the rope shall be passed over the cross bar or jaw 10 through the rope-opening 9, and for drawing the rope taut the free end may be pulled into a return-bend while the lever-handle and cam are turned back, the said positions of this free end and lever-handle being indicated by broken lines in Fig. 2. When the rope is as taut as desired, the lever-handle is turned into the holding position shown by full lines and the rope is securely held. The free end 15 can hang pendently from the rope-opening 9, as shown.

We claim as our invention—

The herein-described rope-clamp consisting of the frame A having the rope-opening 9 near one end, the cross-bar 10 at the outer end of said frame rounded (as seen in cross-section) for drawing a rope over it with a return-bend, the inner rounded face of said cross-bar forming also a holding-jaw that stands obliquely to the length of the frame, said frame having also the side ears 5 immediately by the sides of the said rope-opening 9 and also the eye 11 at the end opposite the said rounded cross-bar 10, and a snail-like cam 7 having extended therefrom a lever-handle 8 with the cam portion pivoted between the said ears 5, with its axis diagonally opposite the said inner rounded face of the cross-bar 10, and outside of the rope-opening through the said frame, substantially as described.

JAMES T. LEE.
LORENZO P. LEE.

Witnesses:
JAMES SHEPARD,
A. W. STIPEK.